(12) United States Patent
Tao et al.

(10) Patent No.: US 12,523,641 B2
(45) Date of Patent: Jan. 13, 2026

(54) GAS ANALYZER CALIBRATION

(71) Applicant: Baker Hughes Holdings LLC, Houston, TX (US)

(72) Inventors: Chong Tao, Billerica, MA (US); Aniruddha S. Weling, Wayland, MA (US)

(73) Assignee: Baker Hughes Holdings LLC, Houston, TX (US)

(*) Notice: Subject to any disclaimer, the term of this patent is extended or adjusted under 35 U.S.C. 154(b) by 848 days.

(21) Appl. No.: 17/848,067

(22) Filed: Jun. 23, 2022

(65) Prior Publication Data

US 2023/0417717 A1    Dec. 28, 2023

(51) Int. Cl.
*G01N 33/00* (2006.01)
*G01N 21/39* (2006.01)

(52) U.S. Cl.
CPC ......... *G01N 33/0006* (2013.01); *G01N 21/39* (2013.01); *G01N 2021/399* (2013.01); *G01N 2201/062* (2013.01)

(58) Field of Classification Search
CPC .. G01N 21/274; G01N 21/39; G01N 33/0006; G01N 2021/399; G01N 2201/062
See application file for complete search history.

(56) References Cited

U.S. PATENT DOCUMENTS

| | | | |
|---|---|---|---|
| 9,347,877 B2* | 5/2016 | Hirata | G01N 21/3504 |
| 11,280,724 B2* | 3/2022 | Brauer | G01N 21/3504 |
| 11,287,371 B2* | 3/2022 | Shie | G01L 19/0092 |

* cited by examiner

*Primary Examiner* — An H Do
(74) *Attorney, Agent, or Firm* — Mintz, Levin, Cohn, Ferris, Glovsky and Popeo, P.C.

(57) ABSTRACT

A calibration method includes receiving data characterizing a first pressure broadening coefficient, a second pressure broadening coefficient and a third pressure broadening coefficient of the target gas absorption associated with a first background gas, a second background gas and a third background gas, respectively. The method further includes, determining a molar ratio associated with the second background gas and the third background such that an effective pressure broadening coefficient associated with a target gas mixture including the second background gas and the third background gas mixed at the determined molar ratio is within a predetermined threshold of the first broadening coefficient. The target gas mixture further includes a target gas. The method also includes calibrating a gas analyzer using the target gas mixture to replace the calibration of the target in the first background gas. The calibration is based on absorption of electromagnetic radiation by the target gas in the target gas mixture.

18 Claims, 4 Drawing Sheets

GAS ANALYZER CALIBRATION

BACKGROUND

Absorption spectroscopy can allow for determination whether a particular chemical species is present in a sample. Absorption spectroscopy can also allow for determination of the concentration of the species in the sample. Absorption spectroscopy can include transmitting one or more wavelengths of electromagnetic radiation through a sample and detecting the spectrum of the transmitted radiation. The transmitted radiation spectra can include signatures of the type and concentration of species in the sample. For example, by identifying the wavelength/frequency that corresponds to the peak absorption of the transmitted radiation, a species in the sample can be identified. Additionally, the concentration of the species can be determined using the Beer-Lambert law.

SUMMARY

Various aspects of the disclosed subject matter may provide one or more of the following capabilities.

In one implementation, a method includes receiving data characterizing a first pressure broadening coefficient, a second pressure broadening coefficient and a third pressure broadening coefficient of the target gas absorption associated with a first background gas, a second background gas and a third background gas, respectively. The method further includes, determining a molar ratio associated with the second background gas and the third background such that an effective pressure broadening coefficient associated with a target gas mixture including the second background gas and the third background gas mixed at the determined molar ratio is within a predetermined threshold of the first broadening coefficient. The target gas mixture further includes a target gas. The method also includes calibrating a gas analyzer using the target gas mixture. The calibration is based on absorption of electromagnetic radiation by the target gas in the target gas mixture.

One or more of the following features can be included in any feasible combination.

In some implementations, the method further includes receiving data characterizing a first absorption spectrum associated with a first gas mixture including the target gas and the first background gas, a second absorption spectrum associated with a second gas mixture including the target gas and the second background gas, and a third absorption spectrum associated with a third gas mixture including the target gas and the third background gas. The method also includes calculating an effective absorption spectrum associated with the target gas mixture based on the second absorption spectrum and the third absorption spectrum. The method also includes determining that the target gas mixture is suitable for calibration based on comparison of the first absorption spectrum and the effective absorption spectrum.

In some implementations, determining that the target gas mixture is suitable for calibration includes comparing at least a first absorption value from the first absorption spectrum and a second absorption value from the effective absorption spectrum. The first absorption value and the second absorption value are associated with a first wavelength of the electromagnetic radiation. In some implementations, the method further includes selecting the second background gas and the third background gas based on the second pressure broadening coefficient and the third pressure broadening coefficient, wherein the second pressure broadening coefficient is less than the first pressure broadening coefficient and the third pressure broadening coefficient is greater than the first pressure broadening coefficient.

In some implementations, the concentration of target gas in the first background gas is the same as the concentration of the target gas in the target gas mixture. In some implementations, the electromagnetic radiation is generated by one of a narrow-band light source and a broad-band light source. In some implementations, the narrow-band light source incudes a laser, and the broad-band light source includes one of a light emitting diode or a lamp. In some implementations, the electromagnetic radiation generated by the narrow band light source is a collimated laser beam.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Figure 1:
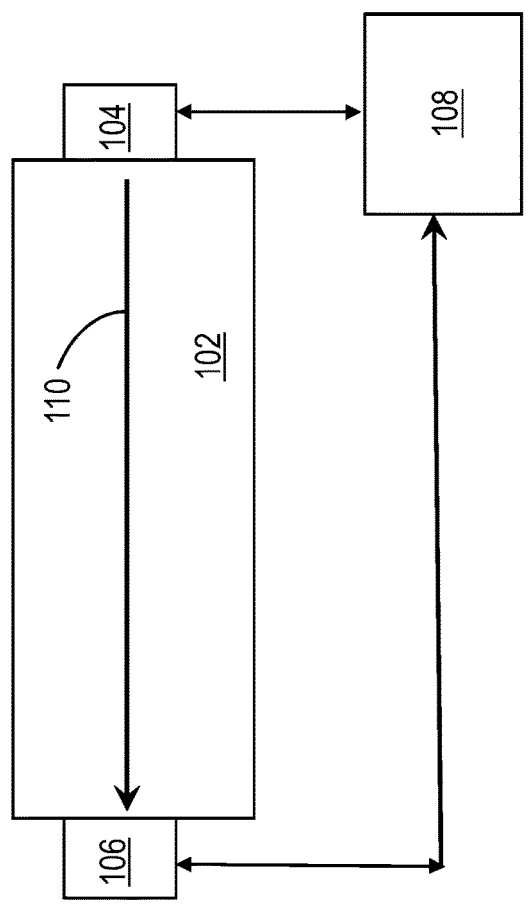
FIG. 1 illustrates an exemplary optical gas analyzer.

Industrial processes involve the reaction, storage and transport of a variety of complex mixtures of gases including hydrocarbons like Methane, Ethane, and Ethylene. Detecting and analyzing a target gas species in such gaseous mixtures can provide information associated with the industrial processes. For example, moisture is not only a process variable to be measured in many industrial applications such as natural gas processing and metal heat treatment, but also a common contaminant, which must be tightly controlled. Moisture can reduce product quality, damage industrial equipment, and significantly increase operating costs, which makes the accurate monitoring of trace moisture levels in many gas mixtures critical to plant maintenance. In some implementations, wavelength modulation spectroscopy can be used to detect a target gas (or a concentration thereof) in the gaseous mixture. This can be achieved by transmitting electromagnetic radiation with multiple wavelengths through the gas mixture and detecting the absorption of the various wavelengths (or absorption spectrum) by the target gas. The absorption spectrum can be indicative of the concentration of the target gas (e.g., water vapor) in the gas mixture. For example, the magnitude of absorption by the target gas can be proportional to the concentration of the target gas.

In some cases, absorption by the target gas can be a non-linear function of the concentration of the target gas in the gas mixture. Additionally, presence of another gas (also referred to as background gas) in the gas mixture can change the absorption spectrum (e.g., height of the spectrum, width of the spectrum, etc.) of the target gas and can further complicate the relationship between the measured absorption spectrum and concentration of the target gas. For example, the background gas can broaden the absorption spectrum of the target gas. This process is referred to as pressure broadening, and is characterized by the pressure broadening coefficient of the background gas. Calibration of the gas analyzer can establish a relationship between the absorption spectrum and the concentration of the target gas. This can improve the accuracy of the gas analyzer in the detection and measurement of the target gas.

A gas analyzer can be calibrated prior to deployment at an industrial site for the detection of the target gas. The gas analyzer can be calibrated in a controlled setting (e.g., in a laboratory) by providing the gas analyzer with the gas mixture (which includes known concentration of the target gas and a first background gas) and performing wavelength modulation spectroscopy. However, it may be challenging to handle the first background gas in the controlled setting. For example, the first background gas may be toxic, and as result, be dangerous to the users of the gas analyzer during the calibration process. Alternately, the first background gas may be expensive. In some cases, the background gas may have a low vapor pressure. As a result, the first background gas may at least partially exist in liquid form at normal pressure and temperature (e.g., 298° K and 1 atmosphere pressure). It may be challenging to calibrate the gas analyzer in the presence of a liquid. In these cases, it may be desirable to replace the first background gas with a mixture of two or more background gases (e.g., a second background gas and a third background gas) that can have same/similar impact on the absorption spectrum (e.g., similar broadening of the absorption spectrum) of the target gas as the first background gas. In some implementations of the current subject matter, systems and methods for identifying background gases that can replace a given background gas in the gaseous mixture (which includes the target gas) is described. The replacement background gases can have similar impact on the absorption spectrum of the target gas as the given background gas, while being more practical or cost-effective to use in the calibration process.

FIG. 1 illustrates an exemplary gas analyzer 100 that can detect a target gas (e.g., concentration of the target gas) present in an industrial process. The gas analyzer can detect the target gas by detecting the absorption of electromagnetic radiation as a function of the wavelength of the electromagnetic radiation (also referred to as absorption spectrum). The gas analyzer includes an optically coupled but mechanically isolated gas chamber 102 that can receive the gas mixture including the target gas for which the gas analyzer 100 is being calibrated. The gas analyzer 100 further includes an electromagnetic radiation source 104 that can generate electromagnetic radiation 110 directed at the gas chamber 102. The electromagnetic radiation source 104 can include a narrowband tunable laser diode that can generate electromagnetic radiation at multiple wavelengths (e.g., by varying either the laser diode injection current or its temperature as a function of time). Alternately, the electromagnetic radiation source 104 can include a broadband source that can simultaneously generate electromagnetic radiation at multiple wavelengths (or an electromagnetic spectrum). The electromagnetic radiation source 104 can be controlled by a computing device 108. For example, the computing device 108 can control the intensity and/or wavelength of the electromagnetic radiation emitted by the electromagnetic radiation source 104.

The electromagnetic radiation 110 is transmitted through the gas mixture and portions of the electromagnetic radiation 110 are absorbed. The gas analyzer 100 further includes a detector 106 configured to detect the intensity of transmitted electromagnetic radiation and generate a signal indicative of the detected intensity. The intensity signal can be transmitted by the detector 106 and can be received and processed by the computing device 108. For example, the computing device can determine the identity/concentration of the target gas in the gas chamber 102 based on the intensity signal and calibration parameters generated by the calibration process.

Figure 2:
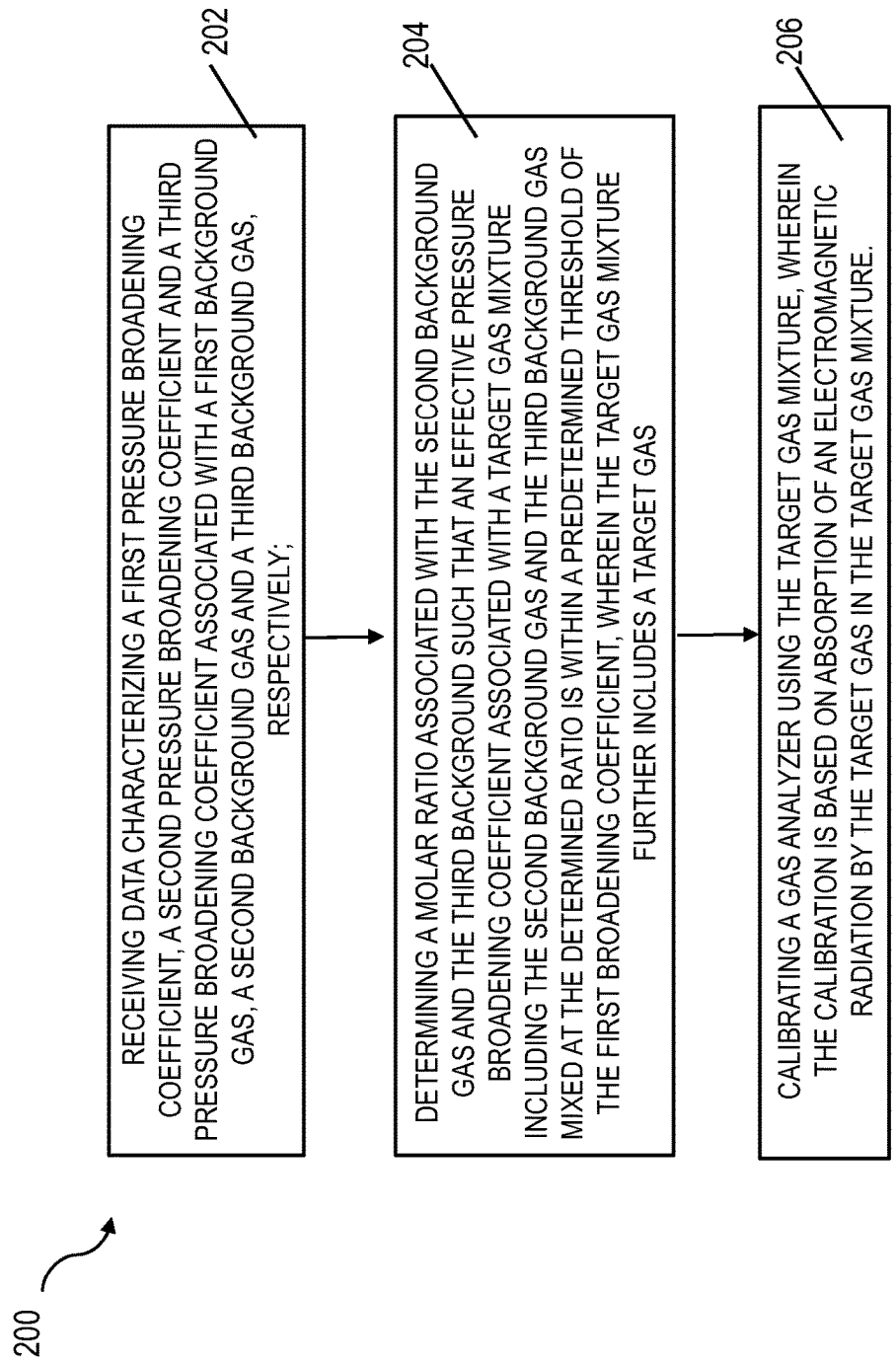
FIG. 2 illustrates a flowchart of an exemplary method for calibrating a gas analyzer.

FIG. 2 illustrates a flowchart of an exemplary method for calibrating a gas analyzer. At step 202, data characterizing pressure broadening coefficients of background gases can be received (e.g., by the computing device 108). For example, a first pressure broadening coefficient, a second pressure broadening coefficient and a third pressure broadening coefficient associated with the first background gas, the second background gas and the third background gas, respectively, can be received. As discussed above, the gaseous mixture present at the industrial site includes the target gas (e.g., water vapor) and the first background gas (e.g., isobutene). If the first background gas is undesirable for calibration of the gas analyzer, it can be replaced by the second background gas and the third background gas during the calibration process (e.g., by nitrogen and propene).

At step 204, a molar ratio associated with the second background gas and the third background is determined. The second background gas and the third background gas can be selected based on the second pressure broadening coefficient and the third pressure broadening coefficient. For example, the second pressure broadening coefficient is greater than the first pressure broadening coefficient and the third pressure broadening coefficient is smaller than the first pressure broadening coefficient. In some implementations, selection of the second background gas and the third background gas can be made from a database of broadening coefficients (e.g., database associated with the computing device 108) of multiple background gases for the same target gas absorption. A necessary condition for the validity of the linear combination of the absorption spectra of the target gas in these background gases is to ensure that there is no chemical interaction between these background gases or between them and the target gas.

When the second background gas and the third background gas are mixed in the molar ratio determined at step 204, an effective pressure broadening coefficient of the mixture is similar to the pressure broadening coefficient of the first background gas (e.g., within a predetermined threshold value of the first broadening coefficient). A target mixture of the second background gas and the third background gas mixed in the molar ratio, and the target gas can be used in the calibration of the gas analyzer instead of the gaseous mixture to be analyzed at the industrial site (including the first background gas and the target gas.).

In some implementations, the molar ratio can be determined by trying to ensure that the effective pressure broadening coefficient is similar to the first pressure broadening coefficient. The molar ratio can be determined by:

$$a_{eff} = a_2 X + a_3(1-X)$$

where $a_{eff}$ is the effective pressure broadening coefficient, $a_2$ is the second pressure broadening coefficient; $a_3$ is the third pressure broadening coefficient, X is the second molar fraction of the second background gas; and (1−X) is the third molar fraction of the third background gas. The molar ratio is the ratio of the second molar fraction and the third molar fraction (X/(1−X)).

Properties of the target gas mixture (e.g., absorption spectrum of the target gas therein) can be calculated and a determination can be made whether the target gas mixture is a suitable substitute of the gas mixture (to be analyzed at the industrial site) for calibrating the gas analyzer. In some implementations, data characterizing a first absorption spectrum (associated with the gas mixture present at the industrial site that includes the target gas and the first background gas), a second absorption spectrum (associated with a second gas mixture including the target gas and the second background gas), and a third absorption spectrum (associated with a third gas mixture including the target gas and the third background gas) can be received. An effective absorption spectrum associated with the target gas mixture can be calculated, by a weighted average of the second absorption spectrum and the third absorption spectrum (e.g., by multiplying the second absorption spectrum and the third absorption spectrum by the second molar fraction and the third molar fraction, respectively, and summing the product).

Figure 3:
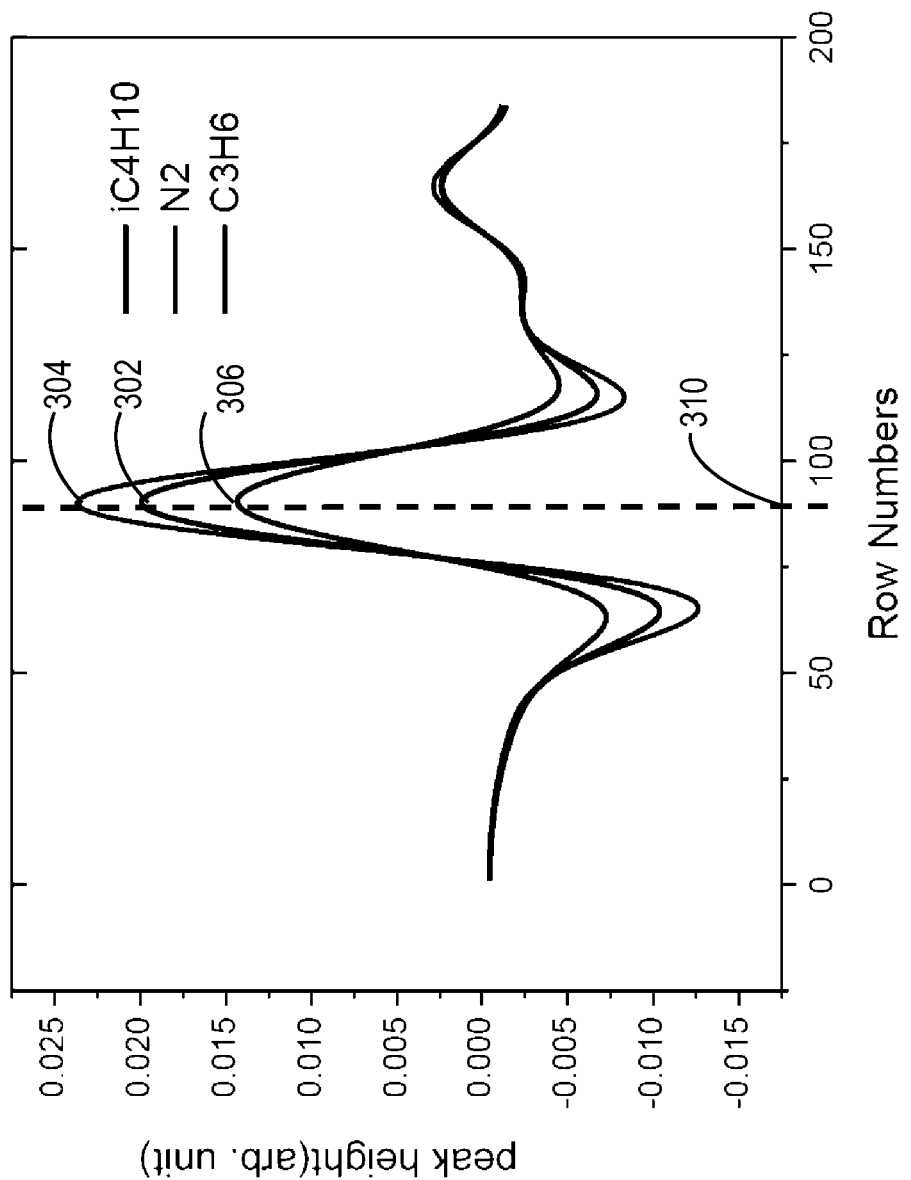
FIG. 3 illustrates an exemplary plot of a first absorption spectrum, a second absorption spectrum, and a third absorption spectrum associated with a first background gas, a second background gas and a third background gas, respectively, mixed with a target gas.

FIG. 3 illustrates an exemplary plot 300 of the first absorption spectrum 302, the second absorption spectrum 304, and the third absorption spectrum 306 (e.g., where the first second and the third absorption spectrum are associated with the same concentration of target gas in the gas mixture). As illustrated in the plot, the second absorption spectrum 304 is narrower (e.g., at the full-width-half-maximum of the spectrum) than the first absorption spectrum 302, and the third absorption spectrum 306 is broader than the first absorption spectrum. This spectral width is characterized by the full width at half the maximum of each absorption spectrum. This indicates that the second pressure broadening coefficient is lower than the first pressure broadening coefficient and the third pressure broadening coefficient is greater than the first pressure broadening coefficient. The peaks of the first/second/third absorption spectra are located at the first wavelength 310.

Figure 4:
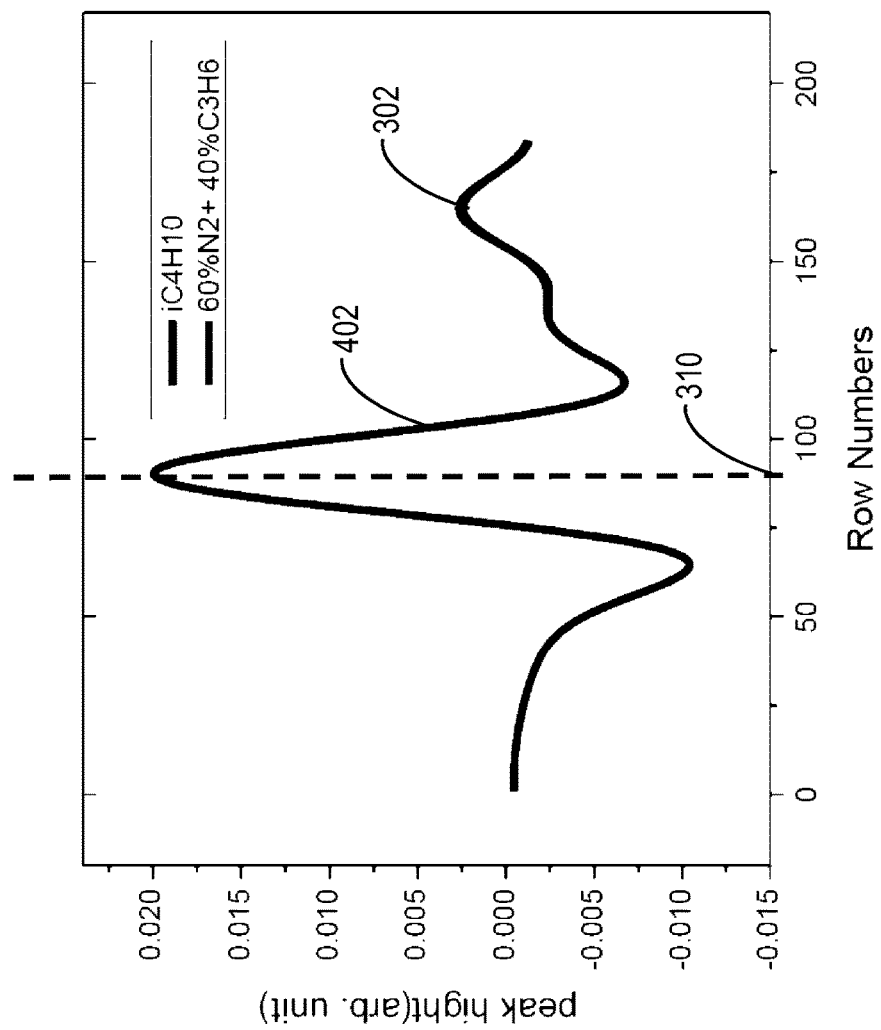
FIG. 4 illustrates an exemplary plot of the first absorption spectrum in FIG. 3, and an effective absorption spectrum associated with a target gas mixture including the second background gas, the third background gas and the target gas.

FIG. 4 illustrates an exemplary plot 400 of the first absorption spectrum 302 and the effective absorption spectrum 402 derived from the weighted sum of the second and third absorption spectra mixed with the pre-determined molar ratio. As illustrated in the plot 400, the first absorption spectrum 302 and the effective absorption spectrum 402 overlap. In some implementations, the determination whether the target gas mixture (associated with the effective absorption spectrum) can be used to calibrate the gas analyzer (instead of the gas mixture to be analyzed at the industrial site) is based on comparison of the first absorption spectrum 302 and the effective absorption spectrum 402. For example, a first absorption value from the first absorption spectrum (at a first wavelength/frequency) and a second absorption value from the effective absorption spectrum (at the first wavelength/frequency) can be compared. The peak of the first absorption spectrum (or the first absorption value) located at the first wavelength 310 can be compared with the peak of the effective absorption spectrum (or the second absorption value) located at the first wavelength 310. If the first absorption value and the second absorption value are within a predetermined range (e.g., absolute value of the difference between the first and the second absorption values is less than a predetermined threshold value), the target gas mixture is determined to be suitable for calibration of the gas analyzer instead of the gas mixture present at the industrial site.

Returning to FIG. 2, at step 206, the gas analyzer can be calibrated using the target gas mixture. The calibration is based on measuring the absorption of electromagnetic radiation by the target gas in the target gas mixture over a specific range of wavelengths. Calibration can include measuring the peak value of the absorption spectrum at a set of known concentrations of the target gas (e.g. $H_2O$) in the specified background gas (e.g. Nitrogen). A primary reference analyzer can serve as an independent gauge to confirm the target gas concentration is maintained at specified values in any background gas during this measurement of the analyzer response. This information can be used to create a calibration curve that relates the measured absorption peak height to the target gas concentration in the specified background gas. This calibration curve can then be used to determine the unknown target concentration in the same or similar background gas. In some implementations, data associated with the calibration curve can be stored in a database (e.g., at step 206).

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method of calibrating a gas analyzer using a target gas mixture comprising a target gas, a second background gas and third background gas, the method comprising:
    receiving data characterizing a first pressure broadening coefficient of the target gas absorption associated with a first background gas, a second pressure broadening coefficient of the target gas absorption associated with the second background gas, and a third pressure broadening coefficient of the target gas absorption associated with the third background gas;
    determining a molar ratio associated with the second background gas and the third background gas, such that an effective pressure broadening coefficient associated with the target gas mixture is within a predetermined threshold of the first broadening coefficient;
    irradiating the target gas mixture with electromagnetic radiation by an electromagnetic radiation source of the gas analyzer;
    detecting an absorption of electromagnetic radiation by the target gas in the target gas mixture; and
    calibrating the gas analyzer using the target gas mixture based on the absorption of electromagnetic radiation by the target gas in the target gas mixture to replace the calibration of the target gas in the first background gas.

2. The method of claim 1, further comprising:
    receiving data characterizing a first absorption spectrum associated with a first gas mixture including the target gas and the first background gas, a second absorption spectrum associated with a second gas mixture including the target gas and the second background gas, and a third absorption spectrum associated with a third gas mixture including the target gas and the third background gas;
    calculating an effective absorption spectrum associated with the target gas mixture based on the second absorption spectrum and the third absorption spectrum provided there is no chemical interaction between them; and
    determining that the target gas mixture is suitable for calibration of the gas analyzer based on comparison of the first absorption spectrum and the effective absorption spectrum.

3. The method of claim 2, wherein determining that the target gas mixture is suitable for calibration includes comparing at least a first absorption value from the first absorption spectrum and a second absorption value from the effective absorption spectrum, wherein the first absorption value and the second absorption value are associated with a first wavelength of the electromagnetic radiation.

4. The method of claim 1, further comprising:
selecting the second background gas and the third background gas based on the second pressure broadening coefficient and the third pressure broadening coefficient, wherein the second pressure broadening coefficient is less than the first pressure broadening coefficient and the third pressure broadening coefficient is greater than the first pressure broadening coefficient.

5. The method of claim 1, wherein the concentration of target gas in the first background gas is the same as the concentration of the target gas in the target gas mixture.

6. The method of claim 1, wherein the electromagnetic radiation source is one of a narrow-band light source or a broad-band light source.

7. The method of claim 6, wherein the narrow-band light source includes a laser, and the broad-band light source includes one of a light emitting diode or a lamp.

8. The method of claim 1, wherein the electromagnetic radiation generated by the narrow band light source is a collimated laser beam.

9. A system for calibrating a gas analyzer using a target gas mixture comprising a target gas, a second background gas and third background gas, the system comprising:
the gas analyzer, wherein the gas analyzer comprises an electromagnetic radiation source;
at least one data processor; and
memory coupled to the at least one data processor, the memory storing instructions to cause at least one data processor to perform operations comprising:
receiving data characterizing a first pressure broadening coefficient of the target gas absorption associated with a first background gas, a second pressure broadening coefficient of the target gas absorption associated with the second background gas, and a third pressure broadening coefficient of the target gas absorption associated with the third background gas;
determining a molar ratio associated with the second background gas and the third background gas, such that an effective pressure broadening coefficient associated with the target gas mixture is within a predetermined threshold of the first broadening coefficient;
controlling the electromagnetic radiation source to irradiate the target gas mixture with electromagnetic radiation;
detecting an absorption of electromagnetic radiation by the target gas in the target gas mixture; and
calibrating the gas analyzer using the target gas mixture based on the absorption of electromagnetic radiation by the target gas in the target gas mixture to replace the calibration of the target gas in the first background gas.

10. The system of claim 9, wherein the operations further comprising:
receiving data characterizing a first absorption spectrum associated with a first gas mixture including the target gas and the first background gas, a second absorption spectrum associated with a second gas mixture including the target gas and the second background gas, and a third absorption spectrum associated with a third gas mixture including the target gas and the third background gas;
calculating an effective absorption spectrum associated with the target gas mixture based on the second absorption spectrum and the third absorption spectrum provided there is no chemical interaction between them; and
determining that the target gas mixture is suitable for calibration of the gas analyzer based on comparison of the first absorption spectrum and the effective absorption spectrum.

11. The system of claim 10, wherein determining that the target gas mixture is suitable for calibration includes comparing at least a first absorption value from the first absorption spectrum and a second absorption value from the effective absorption spectrum, wherein the first absorption value and the second absorption value are associated with a first wavelength of the electromagnetic radiation.

12. The system of claim 9, wherein the operations further comprising:
selecting the second background gas and the third background gas based on the second pressure broadening coefficient and the third pressure broadening coefficient, wherein the second pressure broadening coefficient is less than the first pressure broadening coefficient and the third pressure broadening coefficient is greater than the first pressure broadening coefficient.

13. The system of claim 9, wherein the concentration of target gas in the first background gas is the same as the concentration of the target gas in the target gas mixture.

14. The system of claim 9, wherein the electromagnetic radiation source is one of a narrow-band light source and a broad-band light source.

15. The system of claim 14, wherein the narrow-band light source includes a laser, and the broad-band light source includes one of a light emitting diode and a lamp.

16. The system of claim 9, wherein the electromagnetic radiation generated by the narrow band light source is a collimated laser beam.

17. A computer program product comprising a non-transitory machine-readable medium storing instructions for calibrating a gas analyzer using a target gas mixture comprising a target gas, a second background gas and third background gas, that, when executed by at least one programmable processor that comprises at least one physical core and a plurality of logical cores, cause at least one programmable processor to perform operations comprising:
receiving data characterizing a first pressure broadening coefficient of the target gas absorption associated with a first background gas, a second pressure broadening coefficient of the target gas absorption associated with the second background gas, and a third pressure broadening coefficient of the target gas absorption associated with the third background gas;
determining a molar ratio associated with the second background gas and the third background gas, such that an effective pressure broadening coefficient associated with the target gas mixture is within a predetermined threshold of the first broadening coefficient;
controlling an electromagnetic radiation source of the gas analyzer to irradiate the target gas mixture with electromagnetic radiation;
detecting an absorption of electromagnetic radiation by the target gas in the target gas mixture; and
calibrating the gas analyzer using the target gas mixture based on the absorption of electromagnetic radiation by the target gas in the target gas mixture to replace the calibration of the target gas in the first background gas.

18. The computer program product of claim 17, wherein the operations further comprising:

receiving data characterizing a first absorption spectrum associated with a first gas mixture including the target gas and the first background gas, a second absorption spectrum associated with a second gas mixture including the target gas and the second background gas, and a third absorption spectrum associated with a third gas mixture including the target gas and the third background gas;

calculating an effective absorption spectrum associated with the target gas mixture based on the second absorption spectrum and the third absorption spectrum provided there is no chemical interaction between them; and determining that the target gas mixture is suitable for calibration of the gas analyzer based on comparison of the first absorption spectrum and the effective absorption spectrum.

* * * * *